US008013788B2

(12) United States Patent
Duffett-Smith et al.

(10) Patent No.: US 8,013,788 B2
(45) Date of Patent: Sep. 6, 2011

(54) ASSISTANCE TO A MOBILE SPS RECEIVER (75) Inventors: Peter James Duffett-Smith, Cambridge (GB); Anthony Richard Pratt, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 571 days.

(21) Appl. No.: 11/991,430

(22) PCT Filed: Aug. 31, 2006

(86) PCT No.: PCT/EP2006/065870
§ 371 (c)(1),
(2), (4) Date: Mar. 20, 2008

(87) PCT Pub. No.: WO2007/028759
PCT Pub. Date: Mar. 15, 2007

(65) Prior Publication Data
US 2009/0160703 A1   Jun. 25, 2009

(30) Foreign Application Priority Data

Sep. 5, 2005  (EP) ..................................... 05255420

(51) Int. Cl.
*G01S 19/04* (2010.01)
*G01S 19/44* (2010.01)
(52) U.S. Cl. ............................. 342/357.41; 342/357.27
(58) Field of Classification Search ............. 342/357.43, 342/357.41, 357.27
See application file for complete search history.

(56) References Cited

U.S. PATENT DOCUMENTS

| 6,408,178 | B1 | 6/2002 | Wickstrom et al. |
| 6,433,731 | B1 | 8/2002 | Sheynblat et al. |
| 6,597,311 | B2 | 7/2003 | Sheynblat et al. |
| 7,200,414 | B2 * | 4/2007 | McBurney et al. ........... 455/502 |
| 7,450,063 | B2 * | 11/2008 | Kangas .................... 342/357.12 |
| 2004/0212530 | A1 | 10/2004 | Strickland et al. |
| 2005/0206559 | A1 * | 9/2005 | Diggelen et al. ......... 342/357.06 |

FOREIGN PATENT DOCUMENTS

| EP | 1 336 864 | 8/2003 |
| WO | WO 02/103383 | 12/2002 |
| WO | WO 2006/114408 | 11/2006 |

* cited by examiner

*Primary Examiner* — Gregory C Issing
(74) *Attorney, Agent, or Firm* — Roylance, Abrams, Berdo & Goodman, LLP (57) ABSTRACT A method is described, for use with an SPS mobile terminal receiver 102, of providing a compact assistance vector to initialize and constrain the computation of the terminal's location within a region of validity. The compact assistance vector is provided to a computing node 108 able also to obtain measurements from a mobile terminal satellite positioning system receiver within said region. For a known reference point 104 within the region, the range or ranges from the reference point to one or more satellites 101 of the satellite positioning system are obtained. The range or ranges are represented by a number or numbers of ranging code repeat intervals in a limited resolution format. The compact assistance vector is created from the representation or representations of ranging code repeat intervals and transferred to the computing node 108. The compact assistance vector can then be used to initialize a location computation for the SPS mobile terminal receiver 102.

30 Claims, 3 Drawing Sheets

ASSISTANCE TO A MOBILE SPS RECEIVER

This invention relates to satellite positioning systems and specifically to the provision of assistance for the purpose of resolving the ambiguity in the range measurements made by a satellite positioning system receiver. The assistance data provides both initialising data for the location calculation and constraints to ensure that the iteration does not converge on an incorrect solution.

BACKGROUND TO THE INVENTION

The signals broadcast by the satellites of a Satellite Positioning System (SPS) can be used to locate a mobile station (MS), either directly by the MS itself, or with the assistance of a remote terminal which also receives the signals. Satellite Positioning Systems include the Global Positioning System (GPS), Glonass, Galileo and several other similar systems which use satellites, which may be augmented by ground-based equivalent transmissions, to provide ranging signals and information concerning the location and trajectory of each transmitter. The ranging signal within an SPS design takes the form of signal which is coded in order to perform two functions. The first of these is the provision of a unique identifier for each satellite using a code sequence unique to that satellite. Individual satellites may thus be distinguished from one another. Code sequences for a given SPS constellation of satellites typically belong to a common family. One such family, in widespread use in GPS, is known as the CA code and is transmitted on a frequency of 1575.42 MHz (known as L1) in the L-band. This family has been derived using a code construction method first published by Robert Gold (and known as Gold Codes).

The second function of the encoding of the signal is to spread the spectrum of the transmission. This allows continuous transmission (and hence maximum energy per second) of signals from the satellite whilst simultaneously providing a signal with a narrow auto-correlation function, giving good ranging accuracy.

Members of the CA code used in GPS share certain common characteristics. These include a common architecture for code generation involving the use of two shift registers to form two preferred linear feedback shift register (LFSR) sequences from which the members of the Gold Code family are formed by modulo-two addition. Gold's publications shows how preferred pairs of sequences are identified. Individual families are formed by the control of the relative starting positions of the two LFSR sequences with all possible delays. Each CA code sequence has a different relative starting position of the two LFSR sequences. Often only a sub-set of the available sequences from a family are used. In the case of GPS, 38 members of the Gold Code family have been selected for transmission by the satellite constellation, or for use in testing of the satellites prior to launch, or for use in 'pseudo-lites' (the ground-based equivalents of satellites).

Sequences from finite state machines, such as those using shift registers to generate sequences (using a linear feedback method or otherwise), have only a finite number of elements prior to a repetition of the code. Other techniques for code generation may be used which do not employ the direct re-generation of the code. One such technique is to store all elements of the sequence in a memory device. The satellite then simply recalls each element of the sequence from memory prior to transmission and then transmits the sequence. When the end of the sequence as stored in memory is detected, the sequence pointer returns to the start of the sequence so that the next element transmitted is the first element, and the sequence is repeated.

In practice, therefore, the transmission of the code is repeated continuously. In GPS, the CA code is repeated every millisecond. The length of the code for each satellite is a feature of the code family characteristics and is 1023 elements ($2^{10}$-1), being generated using shift registers with 10 storage elements. The CA codes are transmitted at a rate of $1.023 \times 10^6$ code elements per second. Other SPS transmissions use different code characteristics. One example is the GPS transmission on 1176.45 MHz (known as L5) which uses a code length of 10230 elements transmitted at a rate of $10.23 \times 10^6$ code elements per second.

Most Earth-orbiting satellites used for navigation, such as GPS, reside in Medium Earth Orbits located typically in the range 15,000 to 30,000 km above the Earth's surface. GPS satellites have orbital heights of approximately 20,000 km whilst the Galileo Satellite System uses higher orbits of approximately 24,000 km. The time for signals to travel from the satellite in orbit to a receiver located on the Earth's surface depends for the most part on the distance between satellite and receiver. In the case of GPS, the travel times lie in the range 65 ms to 80 ms. Consequently, the ranging code transmitted from the satellite does not enable an SPS receiver to determine uniquely the range to the satellite because there are always many repetitions of the ranging code (65 to 80 for GPS) in transit along the transmission path between satellite and a receiver located on the Earth's surface.

The signals from all the satellites in a typical SPS are transmitted on the same frequency. The SPS receiver uses correlation techniques to select one specific satellite signal from all those received at the receiver's location. This is well known as code division multiple access (CDMA). There are many techniques which the receiver may use to mechanise the correlation process but the conceptual basis is common. This may be described by steps of generating a replica of the desired satellite code sequence and, having a receiver tuned to the correct signal frequency including any Doppler frequency offset, finding the correct time alignment of the SPS receiver's internal replica code with that received directly from the selected satellite. This process may be conducted either in the time or frequency domain, recognising that convolution in the time domain corresponds to multiplication in the frequency domain (and vice versa). The starting point of the receiver's replica code (known as the code epoch), when aligned with the same received code sequence, is measured with reference to a time held in a clock local to the receiver. The starting points thereby observed change in increments of the code sequence length, with small adjustments for the relative motion of user and satellite. For the GPS CA code signal, the code starting points increment in steps of 1 ms. A measurement of the time of the code epoch in the receiver, computed modulo 1 ms, is known as the 'pseudo-range' for the selected satellite.

The pseudo-range measurement contains a number of errors including the receiver and satellite clock time biases with respect to the GPS reference clock. In addition to these errors, the time of reception of the satellite code includes the transit time of the signals from satellite to receiver. The transit time is the propagation time of radio waves over the distance between satellite and receiver. These waves, for the most part, may be assumed to propagate as if in free space with but with corrections for the extra delay caused by the lower propagation speed in the ionospheric and tropospheric portions of the signal path. Since the transit time of the signals is longer than a code repetition interval, many complete code sequences are simultaneously in transit between satellite and the receiver.

The measurement of range to the satellite cannot be directly determined because of the undetermined quantities and the many code repetition intervals in the signal transit time.

A method of determining uniquely the range to the satellite requires the reception of a data signal from the satellite which contains information concerning the time of transmission of the signal from the satellite with respect to the SPS time reference. The data signal can only be received at signal levels which do not permit significant attenuation along the signal path. Where such data signals may be received, the SPS receiver must first acquire carrier signal phase lock, data bit synchronisation, data word synchronisation and message synchronisation prior to the decoding of sufficient message data to determine the transmission time of a specific code epoch. The duration of the receiver processing may easily exceed the limited time available to make a determination of the exact range to the satellite.

In the prior art as practiced, it is known that the estimation of the range to each satellite is an iterative process. This is because of the existence of multiple location solutions depending upon the assumptions made about how many code sequences are in transit from each satellite to the receiver. When there is a minimum number of measurements—four is just sufficient for a full location solution—the computation will yield a valid solution for any choice of the number of code sequences in transit, leading to an arbitrarily large number of solutions. Most of these solutions can be rejected because the locations are not possible, for example placing the receiver below the surface of the Earth. However, many solutions typically remain which are both physically possible and mathematically correct. Only one of these can be the true solution.

A method of resolving the ambiguity, which is used by many navigation processors, is to continue to accumulate further measurements of pseudo-range to the four visible satellites. The resulting locations derived from these measurements, depending upon the estimates of the number of code sequences in transit, fall into two categories. Many of the location solutions are inconsistent with previous ones using the same code sequence estimates, for example requiring the receiver to move impossibly fast or to have an clock bias outside the limits of probability. Still some solutions remain viable, however, but they become more refined as further SPS satellite pseudo-range measurements are collected. After a sufficient period of data collection, only one solution continues to satisfy the tests of reasonableness, and is finally accepted as the correct solution. The process may take many tens of seconds or minutes to complete, which may be too long for the needs of the application.

When there are more than four satellites visible, and hence more than four SPS pseudo-ranges can be measured, a consistency test can be applied to the multiplicity of potential location solutions. This assists in the rapid elimination of many, but usually not all, incorrect solutions. The process described above may be used, but the length of time required can be less than with just four satellites.

In the case where a previous location solution is already present in the SPS receiver, the process of location determination can be made more rapidly. This depends in part upon the confidence that can be placed in the stored location. One such confidence measure is the age of the solution. Another measure of confidence is associated with how close one possible solution is to the stored value.

US20040212530 describes techniques, in use in the art since 1986, for overcoming the integer millisecond ambiguity problem by using an iterative method. US20040212530 makes ranging measurements to the mobile terminal, a computation using the broadcast satellite ephemeredes and satellite clock correction coefficients, and an estimate of the position of the mobile terminal.

U.S. Pat. No. 6,408,178 describes the provision of assistance data based on knowledge of the location of a spot beam of a satellite communication system, for the purpose of limiting the number of ambiguous solutions which have to be resolved by trial and error.

EP1336864 describes a technique similar to that of US20040212530, and which requires that the position of the satellite positioning receiver be known within 150 km and its clock error within a few seconds.

Another technique for solving the problem of determining the number of code sequences in transit is to make further measurements on the SPS received signals. One such approach as taught in U.S. Pat. No. 6,433,731 and U.S. Pat. No. 6,597,311 is to make both pseudo-range and Doppler measurements to 5 or more SPS satellites.

The present invention aims to solve the problem outlined above of the determination or provision of the coarse distance between SPS satellite and receiver. This is achieved without the use of more than the minimum number of satellites, or the measurement or provision of SPS satellite Doppler information, or the reception or decoding of SPS satellite data. The invention may thereby be beneficially applied to SPS receivers subject to signal blockage (in which the signals are subject to significant attenuation) or to reception regimes in which insufficient time is available to decode the SPS satellite message.

SUMMARY OF THE INVENTION

According to the invention, there is given a method of computing the location of a mobile terminal satellite positioning system receiver, said computation using measurements made by said receiver, the method comprising obtaining for a known reference point within a region of validity, the range or ranges from the reference point to one or more satellites of the satellite positioning system;

representing in a limited resolution format the range or ranges by a number or numbers related to the number of ranging code repeat intervals;

creating a compact assistance vector from said representation or representations of ranging code repeat intervals;

transferring said compact assistance vector to a computing node;

obtaining at said computing node the measurements from the receiver when within the region; and using said measurements and said compact assistance vector to initialise and constrain a location computation of said receiver.

The invention also includes a system for computing the location of a mobile terminal satellite positioning system receiver, said computation using measurements made by said receiver when located within a region of validity, the system including means for providing the computing node with measurements from the mobile terminal satellite positioning system receiver when within the region;

means for obtaining for a known reference point within said region, the range or ranges from the reference point to one or more satellites of the satellite positioning system;

means for representing in a limited resolution format the range or ranges by a number or numbers related to the number of ranging code repeat intervals;

means for creating a compact assistance vector from said representation or representations of ranging code repeat intervals;

means for transferring said compact assistance vector to a computing node; and means for initialising and constraining a location computation using said compact assistance vector.

The location computation may also include the additional step of computing a location solution for the mobile terminal which includes the step of constraining the solution to be consistent with the information contained within the compact assistance vector.

Still further, the location computation may include the step of collecting a further measurements made by the receiver and using this information with the original measurements and the compact assistance vector to determine the location of the mobile terminal. The measurements may include measurements of the pseudo-ranges from the mobile terminal satellite positioning system receiver to each of the satellites.

The compact assistance vector consists of one or more elements, each element corresponding to a particular one of the satellites of the satellite positioning system, and specifying in a limited resolution format the number of ranging code repeat intervals between the satellite and a known reference point. The number of ranging code repeat intervals depends on the distance from the known reference point to a satellite and the repetition time interval of the satellite's code. For example, in a GPS application this number lies between 65 and 80 (inclusive). The integer number of ranging code repeat intervals may be obtained, from the number specified with full resolution by, for example, rounding to the nearest integer. This integer number will be the same for all locations within an area of validity centred on the known reference point. The exact position of the terminal's SPS receiver is not known, but provided that it is within the area of validity it will have the same integer number of ranging code repeat intervals as at the known reference point, and this integer number may be obtained from the compact assistance vector. The number of ranging code repeat intervals represented in the compact assistance vector therefore needs only to be specified coarsely but with sufficient accuracy that rounding errors do not change the integer number of ranging code repeat intervals up or down by one. In practice, this may mean that the elements of the assistance vector are specified with a precision of about a quarter of a ranging code repeat interval. The vector would then include a list of the numbers of quarters of ranging code repeat intervals, each element of the list corresponding to one satellite.

The ranges from the known reference point to each satellite may be measured or calculated. If measured, they may be obtained from one or more additional SPS receivers, at or near the known reference point, which are able to maintain good SPS location solutions and hence are able to provide unambiguous ranges to the satellites in view. Alternatively, the ranges may be calculated by a processor located anywhere using parameters of the satellite orbits.

The known reference point is any point whose geographical position is known and is within the region of validity of the compact assistance vector. In practice, the extent of the region of validity depends on the ranging code repetition time. For example, in a GPS application having a code repetition time of 1 ms, the known reference point may be within about 70 km of the GPS receiver attached to the terminal, so that the number of code repeat intervals may be specified accurately enough to constrain the computation of the GPS receiver's position uniquely to the correct solution. Note that the compact assistance vector is representative of all locations within the region of validity, and not of any one specific location.

It will be appreciated that a number of regions of validity of different sizes and shapes may be induced for any given selection of satellites within the constellation of satellites in view. The compact assistance vector may be structured to allow the mobile terminal satellite positioning system receiver to select from more than one of the several aforesaid regions of validity.

A further possibility is to enjoin several compact assistance vectors corresponding to different regions of validity to create a single compact assistance entity. It will be appreciated that all references herein to "compact assistance vector" refer equally to "compact assistance entity", since the latter is created by enjoining two or more of the former.

The computing node preferably consists of a processor executing a set of instructions which calculates the position of the mobile terminal satellite positioning system receiver using the measurements made by the receiver and assisted by the compact assistance vector. The computing node may be attached to the terminal, or it may be a part of the terminal, or it may be elsewhere and the measurements made by the SPS receiver may be sent to it by any convenient means, for example by a radio link.

As explained above, a position computation is based on measurements of the pseudo-ranges from the SPS receiver to satellites of the satellite positioning system, which have associated code repeat distance ambiguities. The compact assistance vector is used to resolve these ambiguities to provide coarse estimates of the ranges to the satellites. The coarse range estimates are used to initialise the computation in the computing node.

The compact assistance vector also provides a means of constraining the progress of the position computation. For each new position computed in the iterative computation process, the integer number of ranging code repeat intervals between each satellite and the mobile terminal satellite positioning system receiver is computed and represented in the limited resolution format, and is compared with the compact assistance vector to ensure that the solution is valid. Using the compact assistance vector in this way reduces the time required to obtain the final solution since additional measurements are not required.

The compact assistance vector may be transferred to the computing node by any convenient means, for example using a radio link. The link may be either a point-to-point link or a two way communications link, or the compact assistance vector may be broadcast.

The invention may also include the additional steps of:

obtaining for said known reference point one or more satellite clock bias values relative to the satellite positioning system time reference;

combining said range or ranges and satellite clock bias or biases; and producing an enhanced compact assistance vector.

Within any satellite positioning system, the satellite signals are related to a common time-base of a globally defined standard time, e.g. GPS Time taken from a reference clock or Universal Coordinated Time, UTC. For example, within GPS, each satellite in the constellation has a stable atomic clock. The time of each satellite clock is steered towards alignment with the reference clock. The time of each satellite clock is continually measured and compared with the GPS reference clock located on the ground. A three-parameter model is derived by the control segment which describes the difference in time between the two clocks. The three parameters are up-loaded to the satellite and broadcast by the satellite as the clock correction parameters. This has the effect, after making corrections based on the parameters, of aligning the satellite clock closely with the ground-based reference clock. The offset of a satellite's clock with respect to the SPS time reference is known as the clock bias of the satellite.

The signals from a particular satellite, in the present type of Earth-orbiting satellite navigation systems, are transmitted in synchronism with the clock carried on that satellite. The clock bias therefore directly affects the apparent number of code repeat intervals which may be in transit with reference to the common SPS reference clock, since the start of transmission of a code sequence from one satellite will probably be misaligned with respect to that from another by up to the sum of the clock bias values. The measured ranges can be corrected for these clock biases before being converted into assistance vector values. Alternatively, the clock biases can be sent separately as additional elements of the assistance vector.

The afore-mentioned correction for satellite clock bias may be embodied in an enhanced compact assistance vector. The enhanced compact assistance vector is similar to the compact assistance vector except that the range from the known reference point to each satellite is first combined with the current estimate of the satellite clock bias. For example, in one embodiment, a satellite whose current clock bias is positive transmits its signals late, i.e. after the correct time, and therefore the measured range, with respect to the said reference clock, appears to be larger than the geometrical distance. The current clock bias error, after conversion to its equivalent in distance, is therefore subtracted from said measured range, and this corrected value is used to construct the element of the enhanced compact assistance vector appropriate to that satellite.

In some systems which support both the enhanced compact assistance vector and the compact assistance vector it may be necessary to include in the structure of a vector an indicator as to which type of data is carried in the vector.

References hereinafter and throughout the claims to "compact assistance vector", where the context permits, apply equally to "enhanced compact assistance vector".

A further possibility is to enjoin several enhanced compact assistance vectors corresponding to different regions of validity to create a single enhanced compact assistance entity. It will be appreciated that all references herein and throughout the claims where the context permits to "enhanced compact assistance vector" refer equally to "enhanced compact assistance entity", since the latter is formed by enjoining two or more of the former.

The invention may also include the further steps of:
determining the period during which the compact assistance vector, or enhanced compact assistance vector, remains valid,
constructing a validity information vector from said determination;
transferring the validity information vector to the computing node; and
using the validity information vector to modify or reject the compact assistance vector or enhanced compact assistance vector.

The period during which a compact assistance vector of any type remains valid can be signalled by a validity information vector. This vector contains elements corresponding to those in the compact assistance vector and may be time intervals expressed in seconds or any convenient format. For example, an element of a compact assistance vector may have the value of, say, 281 quarter intervals—i.e. 70.25 code repeat intervals. The corresponding validity information vector may have the value—136, meaning that the value of the corresponding compact assistance vector element decreases by one quarter unit every 136 seconds. Other formats and representations are clearly possible. By this means, the period over which a given compact assistance vector can be used is both specified and extended. In some systems, an age-of-data element may be included which allows the computation node to determine the currency of the data carried in the compact assistance vector. In other systems, one or more further time values for each element of the compact assistance vector can be included in the validity information vector to extend further the time over which the data in a given compact assistance vector can be used.

It is often thought that the measurements of pseudo-range from the SPS receiver to just four satellites is sufficient data to allow the calculation of the position of the receiver. This is not the case. Additional pieces of information are required, some being mandatory and others being helpful but not mandatory. Additional pieces of information in the mandatory category include estimates of the satellite clock biases and their rates of change, and the number of complete code sequences in transit between each satellite and the SPS receiver. The uncertainty associated with the latter number is often referred to in GPS as the 'integer ms ambiguity', and it must be resolved for each observed satellite. As has been explained above, one method known in the prior art of resolving the ambiguity is to make additional measurements of the pseudo ranges to each satellite and to use the fact that these are constantly changing (because the satellites are moving). The method finds that set of integer ambiguities which leads to a minimum variance location solution when computed over a period of observation. In the process of finding the location solution, the SPS receiver's own clock bias (or offset from SPS system time) and its rate of change are also determined.

The methods described in U.S. Pat. No. 6,433,731 and U.S. Pat. No. 6,597,311 work well in good reception conditions. However, when there is significant signal blockage, it may not be possible to measure the pseudo ranges to sufficient satellites for the methods taught in U.S. Pat. No. 6,433,731 or U.S. Pat. No. 6,597,311 to be used, and there may be insufficient time available in which to obtain a location solution for the collection of additional measurements to be used for resolving the integer ms ambiguity.

The present invention provides a means of solving the integer ambiguity problem directly, by supplying the integer number of code repeat intervals in transit via a compact assistance vector. This may be derived from a single reference receiver.

A reference SPS receiver, located at a known or determined location with an antenna having a clear view of the SPS satellite constellation, can provide assistance data which can be used to resolve the integer ms ambiguity. The reference receiver operates continuously and determines its position independently of any assistance in normal circumstances. It receives satellite signals and decodes the data messages including the satellite clock correction parameters which allow the satellite clock readings to be corrected to the SPS reference time. These are broadcast, for example, in subframe 1 of the GPS system. The reference SPS receiver tracks all satellites in view measuring pseudo-ranges to each of them. The receiver can also correct its clock to GPS time, though this is not a requirement of the invention. The navigation processor in the reference receiver determines the satellite orbits and positions from the broadcast ephemeris data and may compute its own position and receiver time bias and time bias rate. If the reference receiver is at a fixed location, it can (if required) function in a reduced solution mode in which the location solution is accepted as correct. In this operating mode, the satellite measurements maintain the clock corrections of the receiver.

The navigation processor in this reference SPS receiver computes the distance between each satellite and the reference receiver's antenna, reducing the value to a transit time or equivalent. For illustrative purposes, the transit time is formulated in terms of an integer and fractional number of code sequences in transit between the antenna and each satellite. The measurements may be further enhanced through a correction for the satellite clock time bias with respect to the SPS reference time. Such corrections would attract a continuous update due to the model of the satellite clock time bias rate. The distance between each satellite and the reference receiver antenna is also continuously changing because of the satellite motion along its trajectory. The maximum rate of change is determined by the SPS orbital parameters. For example, in GPS, this rate does not exceed 2.7 µs/s, or the equivalent in distance terms, for satellites located at the satellite visibility horizon. All other GPS satellites have slower rates of change. This implies that the integer number of code sequences in transit between a GPS satellite and the reference receiver changes slowly at a rate not exceeding 1 code sequence per 360 seconds. The rate of change of the satellite clock bias is much slower because it is controlled by an atomic clock on board each SPS satellite.

A communications link typically couples the reference receiver at the known reference point to the computing node where the position of the mobile terminal is calculated. The computation may take place in the mobile terminal itself. Either upon request or through a broadcast, a communications device sends information concerning the integer and fractional part of the number of code sequences in transit for each satellite in common view. In a preferred embodiment, the information includes the satellite clock time bias corrections. The information concerning the integer and fractional parts of the number of code sequences in transit does not need to have high precision. It is sufficient to have only a minimum precision of some fraction of a code repeat interval such as, by way of example only, a ¼ of a code sequence. Consequently, the compact assistance vector, including the quantised number of code sequences for each of the visible satellites or a sub-set or superset thereof, which is provided upon request or broadcast, does not correspond equivalently to any specific position either at or even near to the location of the reference receiver.

In a practical application, the reference receiver does not need to be located near to the mobile terminal. The information collected by the reference receiver, such as ephemeris, clock correction, and almanac information concerning the orbits of the or each SPS satellite and time information, is passed to a computing facility or computing node. Using the information concerning the satellite orbits, time and the clock correction parameters, the computing node determines the number (both integer and fractional parts) of code sequences in transit between the or each satellite and the reference point at a known or determined location. From this information, a compact assistance vector of limited resolution is formed pertaining to the region in which the mobile terminal is located. The known reference point is preferably located near to the mobile terminal, for example at the base-station in a cell based communication system.

In a further preferred embodiment, the or another computing node uses the acquired information to determine the time at which the (limited accuracy) compact assistance vector becomes valid for each SPS satellite and reference site individually or in groups. In an enhanced operating mode, the or another computing facility further determines the time at which the compact assistance vector ceases to be valid. There are other methods of providing the same information such as the median time at which an assistance vector is valid for each or groups of SPS satellites and the duration of validity. Another method of providing validity information would be to provide the times at which the least significant digit of the or each satellite's code sequence in transit changes state and the direction of such change. Each of these means, and others not explicitly described herein, are considered to provide an equivalent validity information vector.

The period of validity of the assistance information may be extended beyond the original validity period through the provision of extra information concerning the rate of change of the integer and fractional number of ranging code sequences in transit. The additional information may be the parameters of an interpolative model. Such extension may optionally take place either in the computing node or in the mobile terminal.

The information concerning the orbits and reference time of the satellite positioning system may be obtained from non-satellite sources. Examples are the broadcast of real time SPS satellite orbital information or historic SPS satellite orbital information and the SPS satellite time biases and time bias rates. The sources of such information may be mixed between broadcast information and that collected in real time through a reference SPS receiver. This information is passed to one or more computing nodes for the determination of the aforesaid compact assistance vector appropriate to a region of validity containing the mobile terminal.

Upon reception, the compact assistance vector is used in and constrains the computation of the navigation solution in order to determine the correct position of the mobile terminal satellite positioning system receiver. In a typical application, the navigation processor replaces its current initial estimates of the distance between each SPS satellite and the mobile receiver using the integer number of code repeat intervals obtained from the information within the compact assistance vector, and the fractional part obtained from its own measurements. In a preferred embodiment, during the process of location determination, the distance between each SPS satellite and mobile terminal is recomputed using the pseudo-range measurements from the mobile terminal satellite positioning system receiver. The location determination method is frequently based on the method of residuals by which means the calculations may be linearised. The residual range for an SPS satellite is combined with the compact assistance vector information to make an initial estimate of the mobile terminal position. In order to provide the corrections unambiguously, in a preferred embodiment, the reference receiver and that attached to the mobile terminal are located within a range of typically 150 km. This distance corresponds to half the distance occupied by a code sequence in transit between an SPS satellite and a terrestrial SPS receiver. The residuals are constrained in the computation of the mobile terminal from exceeding a distance of 150 km, that is approximately 500 µs in equivalent transit time for GPS. This restriction in forming a solution ensures that the number of integer and fractional code sequence periods held in the navigation processor, after the location of the mobile terminal has been determined, is constrained to be within a fraction of 0.5 in comparison with the information in the compact assistance vector.

In some embodiments, it may be preferable to relax the constraint that the number of ranging code sequences (integer plus fraction) in transit be represented with a precision of at least half an integer. In this case, there may be more than one possible solution for the location of the mobile terminal, which may be distinguished using additional information such as further measurements by the mobile terminal satellite positioning system receiver, in conjunction with a quality indicator associated with each solution. The quality indicator is determined from the support, or likelihood, that the associated location solution is correct. When the quality indicator exceeds a threshold value, that particular solution may be selected as the correct solution. Alternatively, the solution may be selected whose quality indicator exceeds the next nearest quality indicator by more than a threshold value.

The method of the invention may also be used to derive a compact assistance vector from a network of reference receivers.

In some embodiments of the invention, the location of the reference receiver may be remote from the known reference point and separated from it by a distance which is significant compared to that of a code sequence in transit (e.g. 150 km in the case of GPS CA code, or 1200 km for Galileo). The compact assistance vector should include all visible satellites at the known reference point, and this can be achieved using several reference SPS receivers joined in a network. Each reference receiver provides information on the orbits and time biases of the SPS satellites within its own view to one or more computing nodes which process this information to form a compact assistance vector appropriate to the region surrounding the known reference point. The process of forming a mixture of the information, in one embodiment, uses quality indicator information supplied by the reference SPS receivers for each satellite data. Examples of information contained in the quality indicator are: closeness to mobile terminal's serving cell site, the elevations of SPS satellites at the mobile terminal's serving cell site, and the signal to noise ratio.

The method of the invention may also be used to derive a compact assistance vector using information from a non-satellite source.

The information needed to construct a compact assistance vector may be determined from non-satellite sources such as is broadcast by the YUMA internet site which contains historic almanac data from which approximate orbits pertaining to the required time period may be generated. Additional internet sites such as that operated by the Jet Propulsion Laboratory provide real time orbit information corrected for measured satellite orbital errors. These are examples of non-satellite sources of orbital and time information which may be used either alone or in combination with data acquired by one or more SPS receivers at one or more reference sites.

A validity information vector may be formed and provided to the mobile terminal as part of the compact assistance vector or separately. The validity information may contain the time or period for which the limited resolution compact assistance vector holds the correct integer and fractional parts of the number of ranging code sequences in transit for one or more of the satellites visible to the mobile terminal satellite positioning system receiver or in the region of the mobile terminal. The validity information vector may also contain a sign indicator to show whether the number of code sequences in transit is increasing or decreasing.

Additional information may be provided to indicate the times at which the data in the compact assistance vector become valid and then become invalid. This allows for the extension of the period of validity using an interpolative model, based for example on a linear modelling of the changes in the numbers of code sequences in transit. The invention also includes models of arbitrary complexity.

The size of the region of validity surrounding the known reference point also affects the period of validity of a compact assistance vector. In a further extension of the validity information vector, additional information may be provided concerning the extent of the region for which a particular compact assistance vector is valid. This information allows suitably equipped mobile SPS receivers to make corrections to the information held within the compact assistance vector depending upon the distance and direction of the mobile terminal from the known reference point. This information may be coupled with the quality indicator information used to determine which of several possible location solutions best represents the actual position of the mobile terminal.

The precision with which the fractional part of the ranging code repeat interval is represented may be chosen to provide a control on the transmission time of the compact assistance vector in a cell based wireless communication system. The precision in the fractional part affects the size of the region of validity around a reference site.

A second computing node may be used for the computation of the location of a mobile terminal. The navigation computation process is provided with a compact assistance vector (in any one of various forms) and with the pseudo-range measurements from the mobile terminal satellite positioning system receiver. The compact assistance vector is valid for the region containing the mobile terminal. The location of the mobile terminal is then determined using the compact assistance vector and the pseudo-ranges measured by the said mobile terminal satellite positioning system receiver with respect to the mobile terminal's clock. The benefit of the invention for these circumstances is the reduction in computation effort and elapsed time to determine the location of the mobile terminal. The mobile terminal's receiver clock bias may be determined at the same time as its location, and this may be transmitted to the mobile terminal satellite positioning system receiver over the cell based communications link for use in the measurements made for future location determinations.

The corrections for the clock bias and bias rate for each satellite-borne clock in the SPS system need not be combined with the number of code sequence repeat intervals in transit prior to the transmission of the assistance vector. One embodiment involves the separate transmission of the clock correction parameters as broadcast by the SPS satellites. In order for this information to be useful in providing correction to the number of integer and fractional parts of a code sequence in transit, an approximate estimate of time may be supplied so that the current correction can be determined. Alternatively, the current correction of time bias may be supplied directly. Since the rate of change of this parameter is very slow for SPS systems because of the use of atomic clocks as the preferred satellite time reference, the additional transmission of the SPS satellite time bias rate is not required, thereby reducing the communications burden.

BRIEF DESCRIPTION OF THE DRAWINGS

An example of the invention will now be described in relation to the attached diagrams in which.

DETAILED DESCRIPTION OF THE INVENTION

Figure 1:
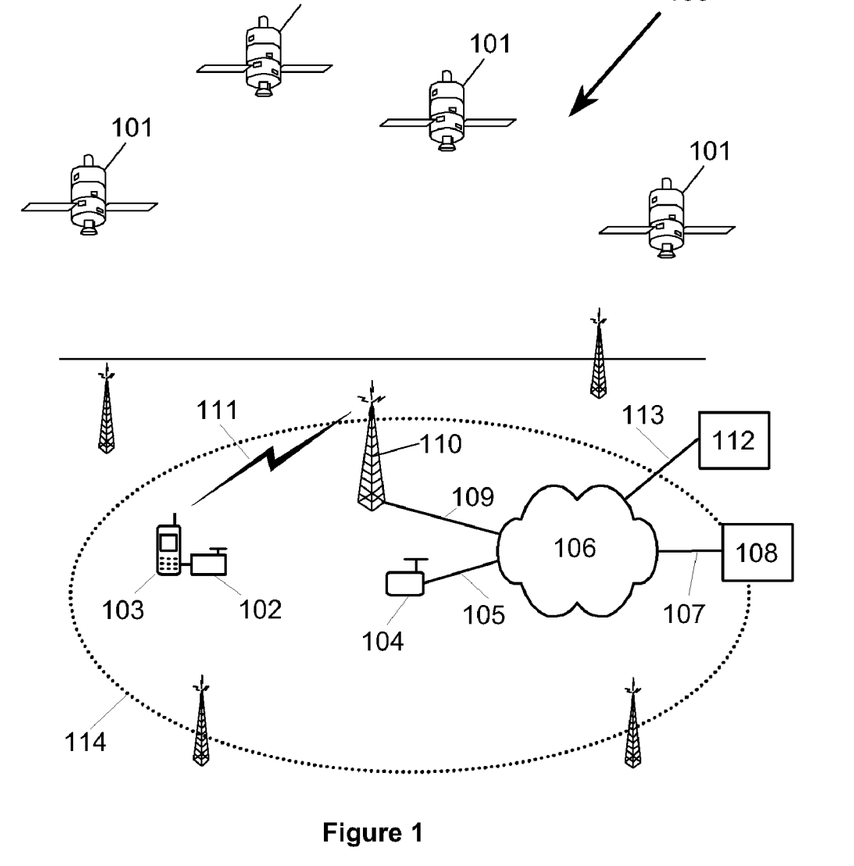
FIG. 1 shows the general features of a satellite positioning system.

FIG. 1 depicts a constellation of satellites 101 of a satellite positioning system 100. An SPS receiver 102 attached to a mobile terminal 103, whose position is to be determined, receives the ranging signals from the satellites 101. A reference SPS receiver 104 is at a known reference point and it uses the signals from the satellites 101 to determine the ranges, satellite clock biases, and satellite clock bias rates of the satellites in view. These determinations are sent via link 105, network 106, and link 107 to a computing node 108 where they are used to construct a compact assistance vector and a corresponding validity information vector. The links 105 and 107 may be implemented by any convenient means, for example they may be cable links or radio links.

The compact assistance vector and validity information vector are sent to a second computing node 112 via link 107, network 106, and link 113. The second computing node 112 also receives pseudo range measurements from the SPS receiver 102 via the terminal 103, radio link 111, network base station 110, link 109, network 106 and link 113. The second computing node 112 calculates the position of the SPS receiver 102 using the pseudo range measurements made by it together with the information contained in the compact assistance vector and the validity information vector. The links 109 and 113 may be implemented by any convenient means, for example they may be cable links or radio links.

In other embodiments of the invention, the separate computing nodes 108 and 112 are separate software programs running in the same physical computer, or are two parts of the same software program. Sometimes, the computing node 112 is attached to, or is part of, the terminal 103 or SPS receiver 102. In these cases, the transmission of the compact assistance vector and validity information vector, calculated in computing node 108, is via links 107, network 106, link 109, network base station 110 and radio link 111. The vectors may be broadcast generally, or transmitted specifically to the terminal 103.

As explained above, the compact assistance vector carries the number of ranging code intervals in transit between each satellite in view and the reference SPS receiver 104 in a limited resolution format. The numbers in the compact assistance vector may apply to all locations within an area of validity 114 surrounding the known reference point (at the reference SPS receiver 104). The mobile SPS receiver 102 is within this area.

Figure 2:
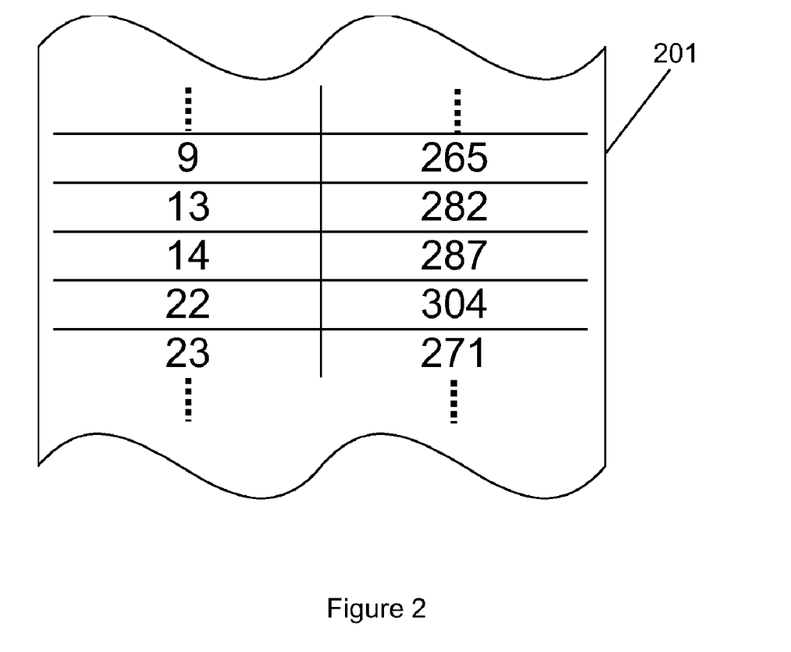
FIG. 2 shows an example of a compact assistance vector.

FIG. 2 gives an example of a compact assistance vector 201. Each number in the left-hand column refers to a particular one of the satellites 101 in view of the reference SPS receiver 104. The corresponding number in the right-hand column denotes the number of ranging code intervals in transit between that particular satellite and the reference SPS receiver 104. In the case shown in FIG. 2, the quantity in the right-hand column represents this number of ranging code intervals in transit in units of a quarter. Thus the satellite number 14, for example, has 287 quarters of a ranging code interval between it and the reference receiver 104, i.e. 287/4=71 integer intervals plus three quarters of an interval, rounded to the nearest quarter. The integer number of intervals would be the same for any SPS receiver at any location within the area of validity 114, throughout the time period indicted by the corresponding validity information vector.

Clearly, other limited-resolution formats are possible. For example, the number of ranging-code intervals in transit may be represented to the nearest one-third of an interval. The format needs to be made as coarse as possible in order to reduce the communications burden, while also ensuring that the integer number is the same for all locations within the area of validity 114 after rounding errors have been taken into account. In one embodiment, a third column is added to the compact assistance vector 201 (not shown in FIG. 2) which denotes the fraction used to represent the number of ranging code intervals. For example, some satellites may be adequately represented within the area of validity 114 by the integer number of intervals because they are near the zenith of the known reference point, whilst others at lower elevations need to be represented by half integers, and yet others near the horizon by quarter integers. In yet another embodiment, the representation for all satellites is in the same format, say half-integer values, but the radius of the corresponding area of validity is different for each satellite, and this information is conveyed in other elements of the compact assistance vector.

As explained above, the numbers of ranging code intervals in transit may be first adjusted for satellite clock bias errors. In this case, the compact assistance vector is known as an enhanced compact assistance vector, and it carries an indicator element (not shown) to indicate that the ranging code numbers have been so adjusted.

Figure 3:
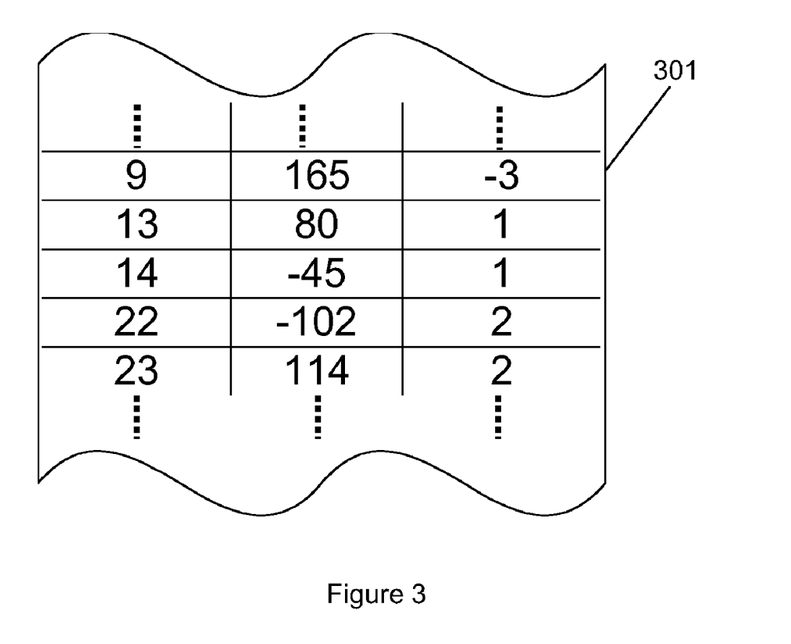
FIG. 3 shows an example of a validity information vector.

Shown in FIG. 3 is an example of a validity information vector 301. As in the case of the compact assistance vector 201, a number in the left-hand column refers to a particular one of the satellites 101 in view of the reference SPS receiver 104. The period over which the corresponding value in the compact assistance vector remains valid is shown in the middle column. This is the number in seconds. Thus the number (282—see FIG. 2) in the compact assistance vector corresponding to satellite number 13 is valid for the next 80 seconds (FIG. 3) before incrementing by one to 283. In the case of satellite number 14, the number in the compact assistance vector (287) decreases by one after 45 seconds. Numbers in the third column represent the changes in seconds to the corresponding numbers in the second column for each period of validity. Thus in the case of satellite number 13, the first validity period is 80 seconds, after which the period increases by 1 (right-hand column) to 81, so that the second validity period is 81 seconds.

Clearly, other representation are possible. For example, the validity information vector could carry numbers representing rates of change rather than periods of validity, or it may carry the coefficients of an equation in powers of elapsed time. In some embodiments, the compact assistance vector and the validity information vector are combined together into a single compact assistance entity, which may also contain other information such as the time at which the entity was calculated.

Figure 4:
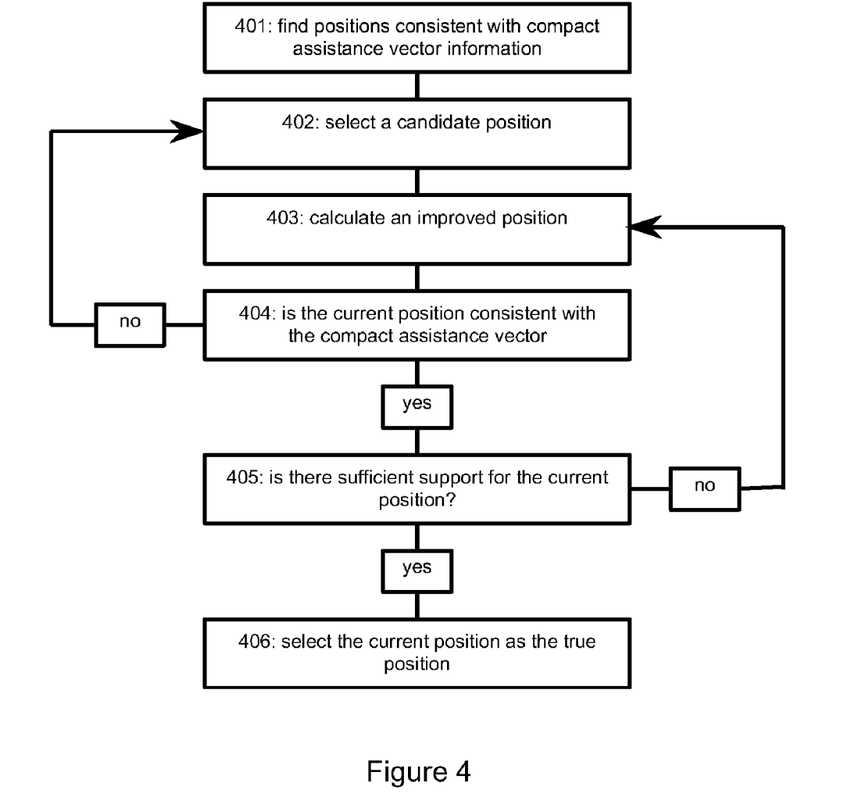
FIG. 4 is a flow chart of a position calculation.

As mentioned above, the information carried in the compact assistance vector can be used both to initialise a position calculation and to constrain the iterative progress of the calculation so as to converge on the correct solution in the shortest possible time. FIG. 4 shows a skeleton flow chart of one method by which the calculation may be made. In step 401, a list of all of the initial positions which are consistent with the information in the compact assistance vector is compiled. One of these is selected, step 402, as a candidate position and combined together with the pseudo-range measurements made by the SPS receiver 102 attached to the mobile terminal 103, and other information, to calculate in step 403 an improved position.

To constrain the calculation, a test is then made, step 404, to determine whether the new position is consistent with the information in the compact assistance vector. If it is not, then another position from the list of initial positions is selected and the process repeated from step 402. If it is, then a further test is made (as well known in the art) in step 405 to determine whether the calculation has converged on the true position. If not, a new calculation is made in step 403.

The invention claimed is:

1. A method of computing the location of a mobile terminal satellite positioning system receiver, said computation using measurements made by said receiver of satellite transmission ranging codes, the method comprising
obtaining for a known reference point within a region of validity, the range or ranges from the reference point to one or more satellites of the satellite positioning system;
creating a representation of each range, in a limited resolution format, as a number related to the number of satellite transmission ranging code repeat intervals, wherein said representation comprises fractions of integers of ranging code repeat intervals in transit;
creating a compact assistance vector from each said representation of ranging code repeat intervals;
transferring said compact assistance vector to a computing node;
obtaining at said computing node the measurements from the receiver when within the region; and
using said measurements and said compact assistance vector to initialise and constrain a location computation of said receiver.

2. A method according to claim 1, further including computing a location solution for the mobile terminal which includes the step of constraining the solution to be consistent with the information contained within the compact assistance vector.

3. A method according to claim 1, including the step of obtaining further measurements made by said receiver for the in-view satellites, and using this information with the original measurements and the compact assistance vector to determine the location of the mobile terminal.

4. A method according to claim 1, wherein the range or ranges from the known reference point to each satellite are measured.

5. A method according to claim 4, wherein the range or ranges are obtained from one or more additional satellite positioning system receivers.

6. A method according to a claim 1, wherein the ranges from the known reference point to each satellite are calculated using parameters of the satellite orbits.

7. A method according to claim 1, wherein the compact assistance vector is structured to allow selection between more than one region of validity.

8. A method according to claim 1, wherein a plurality of compact assistance vectors corresponding to different regions of validity are enjoined to create a single compact assistance entity.

9. A method according to claim 1, wherein the computing node executes a set of instructions which calculates the position of the mobile terminal satellite positioning system receiver using the measurements made by the receiver and assisted by the compact assistance vector.

10. A method according to claim 1, wherein the measurements made by the mobile terminal satellite positioning system receiver are sent to the computing node by a radio link.

11. A method according to claim 1, wherein said computation is iterative, and for each new position computed via said iterative computation, the number of ranging code repeat intervals between each satellite and the mobile terminal satellite positioning system receiver is computed and is compared with the compact assistance vector to ensure that the solution is valid.

12. A method according to claim 1, wherein the compact assistance vector is transferred to the computing node by a point-to-point link, or by a two-way communications link, or by broadcasting.

13. A method according to claim 1, further including:
obtaining for said known reference point one or more satellite clock bias values relative to the satellite positioning system time reference;
combining said range or ranges and satellite clock bias or biases; and
producing an enhanced compact assistance vector.

14. A method according to claim 13, wherein the ranges are corrected for clock biases before being converted into the enhanced compact assistance vector.

15. A method according to claim 13, wherein the clock biases are sent separately as additional elements of the assistance vector.

16. A method according to claim 13, wherein, for a respective satellite, the current clock bias error, after conversion to its equivalent in distance, is subtracted from the measured range, and the corrected value is used to construct the element of the enhanced compact assistance vector appropriate to that satellite.

17. A method according to claim 1, further including:
determining the period during which the compact assistance vector, or enhanced compact assistance vector, remains valid,
constructing a validity information vector from said determination;
transferring the validity information vector to the computing node; and
using the validity information vector to modify or reject the compact assistance vector or enhanced compact assistance vector.

18. A method according to claim 17, wherein a plurality of time values is included for each element of the compact assistance vector or enhanced compact assistance vector in the validity information vector to extend further the time over which the data in a given compact assistance vector or enhanced compact assistance vector can be used.

19. A method according to claim 1, wherein the or another computing node uses the acquired information to determine the time at which the compact assistance vector becomes valid for each SPS satellite and known reference point individually or in groups.

20. A method according to claim 1, wherein the or another computing node further determines the time at which the compact assistance vector ceases to be valid.

21. A method according to claim 1, wherein the period of validity of the assistance vector is extended beyond the original validity period through the provision of extra information in the assistance vector concerning the rate of change of the integer and fractional number of ranging code sequences in transit.

22. A method according to a claim 1, wherein the compact assistance vector is derived from a network of reference receivers.

23. A system for computing the location of a mobile terminal satellite positioning system receiver receiving satellite transmission ranging codes, said computation using measurements made by said receiver when located within a region of validity, the system including
means for providing the computing node with measurements from the mobile terminal satellite positioning system receiver when within the region;
means for obtaining for a known reference point within said region, the range or ranges from the reference point to one or more satellites of the satellite positioning system;

means for creating a representation of each range, in a limited resolution format as a number or numbers related to the number of satellite transmission ranging code repeat intervals;

means for creating a compact assistance vector from each said representation of ranging code repeat intervals;

means for transferring said compact assistance vector to a computing node; and means for initialising and constraining a location computation using said compact assistance vector, wherein the means for representing the range by a number of ranging code repeat intervals in a limited resolution format includes means for representing integers using fractions of integers of ranging code repeat intervals in transit.

24. A system according to claim 23, wherein the means for providing the computing node with measurements from the mobile terminal satellite positioning system receiver within said region includes components of one or more of a radio, cable, or network link.

25. A system according to claim 23, wherein the mobile terminal SPS receiver or mobile terminal includes the computing node.

26. A system according to claim 23, wherein the means for obtaining for a known reference point within said region, the range or ranges from the reference point to one or more satellites of the satellite positioning system includes one or more of a reference receiver located at or near the reference point, or a network of receivers, or calculating means for using known orbital parameters.

27. A system according to claim 23, wherein the means for creating the compact assistance vector from said representation or representations of ranging code repeat intervals includes a processor executing a set of instructions.

28. A system according to claim 23, wherein the means for transferring said compact assistance vector to the computing node includes components of one or more of a radio, cable, or network link.

29. A system according to claim 23, wherein the fractions of integers are selected from the group comprising ½, ⅓, ¼, . . . , 1/n of ranging code repeat intervals, where n is an integer.

30. A method according to claim 1, wherein the fractions of integers are selected from the group comprising ½, ⅓, ¼, . . . , 1/n of ranging code repeat intervals, where n is an integer.

* * * * *